United States Patent [19]

Grove et al.

[11] 3,911,724

[45] Oct. 14, 1975

[54] SPHERE LAUNCHER AND METER PROVER APPARATUS AND METHOD

[75] Inventors: Marvin H. Grove, Houston; Ronald G. Dunegan, Katy, both of Tex.

[73] Assignee: M & J Valve Company, Houston, Tex.

[22] Filed: Jan. 17, 1974

[21] Appl. No.: 434,088

Related U.S. Application Data

[63] Continuation-in-part of Ser. No. 331,252, Feb. 9, 1973, abandoned.

[52] U.S. Cl. ..................................................... 73/3
[51] Int. Cl.² ........................................ G01F 25/00
[58] Field of Search ...................................... 73/3, 4

[56] References Cited
UNITED STATES PATENTS

| | | | |
|---|---|---|---|
| 3,387,483 | 6/1968 | Van Arsdale | 73/3 |
| 3,638,475 | 2/1972 | Grove et al. | 73/3 |
| 3,668,923 | 6/1972 | Grove et al. | 73/3 |
| 3,738,153 | 6/1973 | Simmons | 73/3 |
| 3,777,545 | 12/1973 | Grove et al. | 73/3 |
| 3,800,587 | 4/1974 | Clinton | 73/3 |

FOREIGN PATENTS OR APPLICATIONS

| | | | |
|---|---|---|---|
| 1,203,735 | 9/1970 | United Kingdom | 73/3 |

*Primary Examiner*—Richard C. Queisser
*Assistant Examiner*—Daniel M. Yasich
*Attorney, Agent, or Firm*—Flehr, Hohbach, Test, Albritton & Herbert

[57] ABSTRACT

A sphere launching device and method for use with liquid pipelines and meter prover incorporating such a device. A hollow body has a first opening in a side wall of the same adapted to receive a sphere, and a second opening spaced axially from the first into which a sphere is launched. A shuttle assembly is disposed within the body and is moved between sphere receiving and launching positions. It includes a plunger having sealing means which provides a seal for launching position of the shuttle assembly, a sphere guard and a sphere carrier, and a flow restricting means for restricting back flow of liquid while the assembly is in a sphere receiving position. There is provision for detecting leakage past the plunger at the time a sphere is launched and while the assembly remains in launching position. Also a meter prover apparatus and method making use of the launcher.

15 Claims, 11 Drawing Figures

SPHERE LAUNCHER AND METER PROVER APPARATUS AND METHOD

CROSS-REFERENCE TO COPENDING APPLICATION

This application is a continuation-in-part of our copending application Ser. No. 331,252 filed Feb. 9, 1973 and now abandoned for "Sphere Launcher and Meter Prover Apparatus and Method"

BACKGROUND OF THE INVENTION

This invention relates generally to apparatus and methods for launching spheres into liquid pipelines, and to meter prover apparatus and methods making use of such apparatus.

Sphere launching devices are commonly used in connection with liquid pipelines for introducing spheres which are flow propelled through the line. When incorporated in a meter prover of the unidirectional type, the device becomes a part of an interchange which receives a sphere from the outlet end of the metering loop, and causes it to be launched into the inlet end of the loop to commence a metering run. U.S. Pat. No. 3,638,475 shows one type of sphere launching device and meter prover, which makes use of a box-like body connected to the inlet and outlet portions of the metering loop and also connected to the upstream and downstream sides of the line. A shuttle device within the body moves between sphere receiving and sphere launching positions. After being launched the sphere is flow propelled into the inlet end of the metering pipe and is retained within the interchange when delivered from the outlet end of the pipe.

Launching devices and meter provers as described above are relatively expensive, due to the nature and size of the parts employed and the seals required to prevent leakage through the interchange. In addition rapid movements of the shuttle between sphere receiving and launching positions tends to cause hydraulic hammer or shock, which may cause injury to associated equipment. Also, leakage detection is not as reliable as desired since it depends upon detecting pressure build-up after a venting operation.

Another type of launching device used in conjunction with meter provers makes use of a cylindrical sleeve having an internal diameter slightly less than the diameter of the spheres. At least one sphere is retained within the sleeve during a metering run and serves to provide a seal to prevent leakage through the interchange. Launching is carried out by mechanically forcing a sphere into the sleeve whereby a sphere previously within the sleeve is discharged into the inlet end of the metering pipe. With this type of meter device one or more spheres may remain within the sleeve for a considerable period of time, thus causing some permanent deformation which may interfere with proper sealing between the sphere and the inner walls of the metering pipe, during a metering run. Also many of such meter devices do not have reliable means for detecting leakage through the interchange.

SUMMARY OF THE INVENTION

In general it is an object of the present invention to provide a sphere launching apparatus and method which overcomes the disadvantages referred to above.

Another object is to provide a sphere launching apparatus and a meter prover which are relatively simple in mechanical construction and reliable in operation.

Another object is to provide a sphere launching apparatus and method which handles the spheres in such a manner as to avoid any physical injury.

Another object of the invention is to provide a sphere launcher and meter prover apparatus and method which involves movement of spheres into the interchange and delivery of the spheres from the interchange, under the force of gravity, and which avoids hydraulic shock in its operation.

Another object of the invention is to provide a sphere launcher and meter prover apparatus and method having reliable means for detecting any leakage through the interchange at the start of and during the course of a metering run, and means employed making use of pressure differential between the line pressure and a lower pressure developed within the sealing means.

In general the present invention employs a hollow body having a spaced sphere receiving and launching openings. Within the body there is a shuttle assembly which can be reciprocated between two operating positions, in one of which a sphere is received by a carrier forming a part of the shuttle assembly, and in the other of which the sphere is permitted to pass through an outlet opening. The shuttle assembly includes a plunger, a guard means extending from one end of the plunger, and a sphere carrier extending from the other end of the plunger. A sleeve having an internal diameter substantially greater than the diameter of the spheres forms a part of the interchange, and is located between the sphere receiving and the sphere launching openings. The plunger is adapted to have a seal fit within the sleeve for sphere launching position of the shuttle assembly. The shuttle assembly also includes a flow restriction member which is disposed within the sleeve when the shuttle assembly is in sphere receiving position. Preferably leak detection means is provided to detect any leakage past the plunger when the assembly is in sphere launching position. This detecting means makes use of the difference between the line pressure and a substantially lower pressure developed within the sealing means when the plunger is within the sleeve.

Additional objects and features of the invention will appear from the following description in which the preferred embodiment has been set forth in detail in conjunction with the accompanying drawings.

BRIEF DESCRIPTION OF THE DRAWINGS

Referring to the drawings.

DETAILED DESCRIPTION OF PREFERRED EMBODIMENTS

Figure 1:
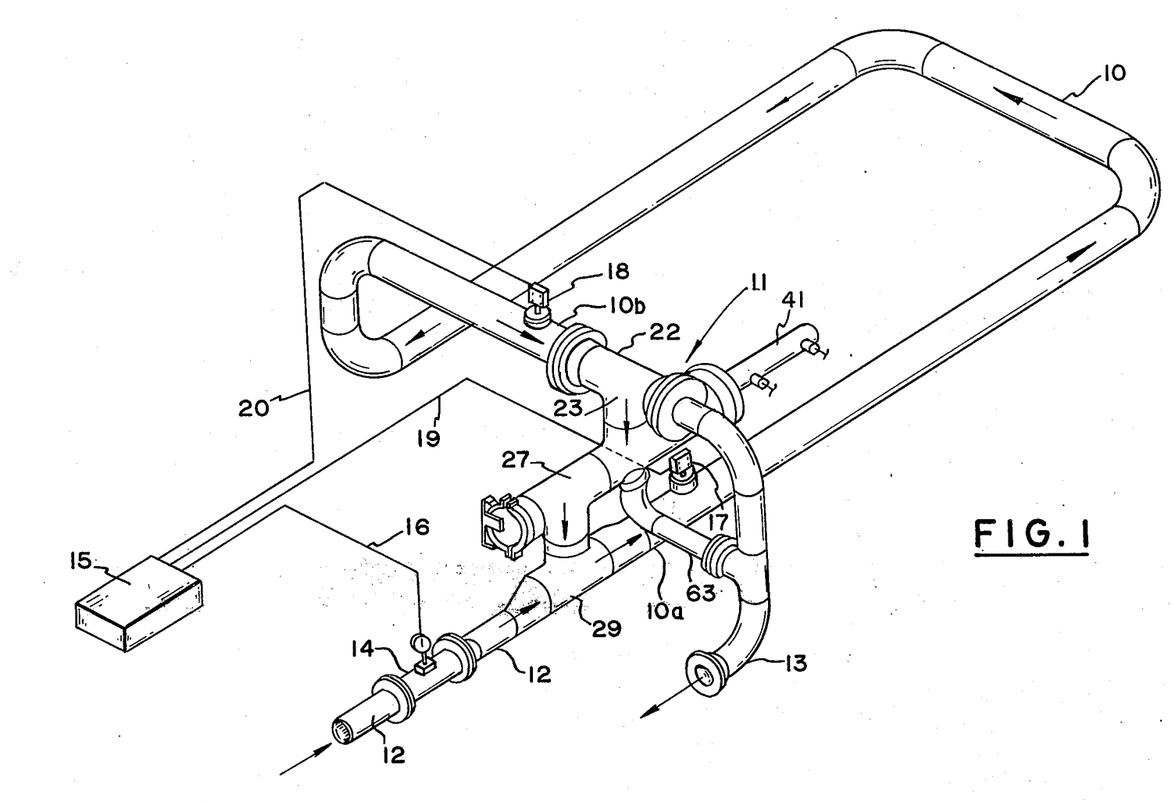
FIG. 1 is a perspective view illustrating a meter prover incorporating the invention.

The unidirectional meter prover illustrated in FIG. 1 consists of a meter proving pipe 10 having inlet and outlet portions 10a and 10b. The inlet and outlet portions are connected by the interchange 11, which serves to receive a sphere at the end of the meter proving run, and is arranged to relaunch the sphere into the inlet portion 10a when it is desired to commence a new run. Upstream pipe 12 supplies liquid from the main line to the meter prover, and downstream pipe 13 returns the liquid back to the main line. A flow meter 14 (e.g., of the turbine type) is shown interposed in line 12. It is the function of the meter prover to make flow rate determinations which can be used for calibrating or correcting the readings of meter 14. Generally such a meter is provided with the means for generating electrical pulses, the frequency of which is in direct proportion to the rate of flow through the meter body. Suitable means such as an electronic counter 15 is shown connected to the meter 14 by cable 16, and serves to provide flow readings.

The meter proving pipe 10 is provided with sphere detectors 17 and 18 located in the inlet and outlet portions. These devices are shown connected to the counter 15 by cables 19 and 20, whereby controlling start and stop pulses are supplied to the counter. The mode of operation of such equipment is as follows. Assuming that a sphere is launched into the inlet 10a of the metering pipe, it is flow propelled past the sphere detector 17, which supplies a start pulse to the counter 15. Eventually the sphere is flow propelled past the detector 18, and this serves to apply a stop pulse to the counter. The counter reading thus obtained can be used to check the accuracy of the flow meter 14, since the volume of the meter proving pipe between the detecting points 17 and 18 is known.

Figure 2:
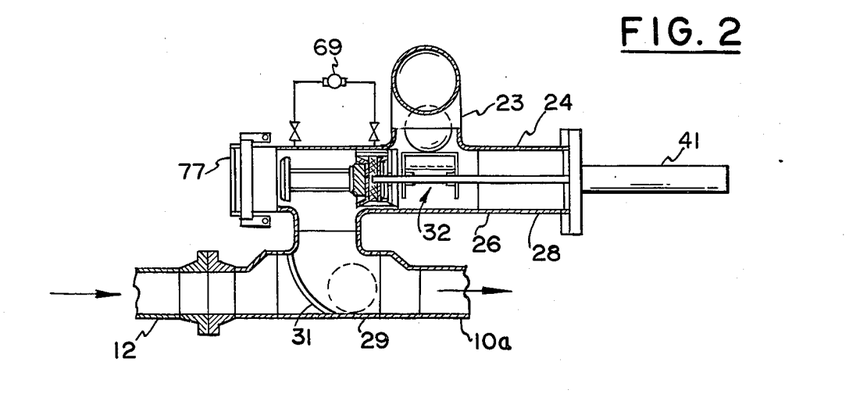
FIGS. 2, 3 and 4 are side elevational views in section illustrating different operating conditions for the sphere launching device incorporated in the meter prover of FIG. 1.
Figure 3:
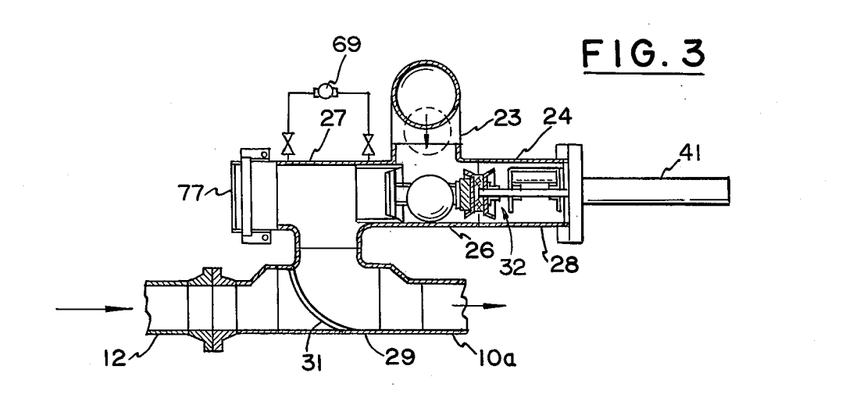
Figure 4:
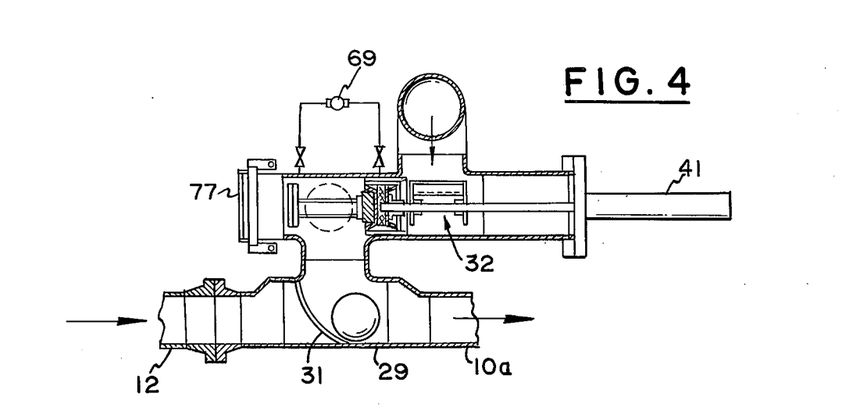

The sphere receiving and launching means incorporated in the interchange 11 is shown in FIGS. 2–4 and also in the enlarged FIGS. 5–8. More specifically, the outlet end portion 10b of the metering pipe is coupled to a Tee 22, which has a downwardly extending portion 23 that is coupled to the interchange body 24. This body can be conveniently formed of two Tees 26 and 27 and the extension 28. Tee 27 is coupled to an underlying Tee 29. The inlet end 10a of the metering pipe and the line 12 are connected to the aligned flow passages of Tee 29. Also this Tee may be provided with interior inclined bars 31, to deflect a sphere toward the metering pipe. Within the body 24 there is a shuttle assembly 32, which is actuated between sphere receiving and sphere launching positions. The interior of the interchange body is circular in transverse section.

Figure 5:
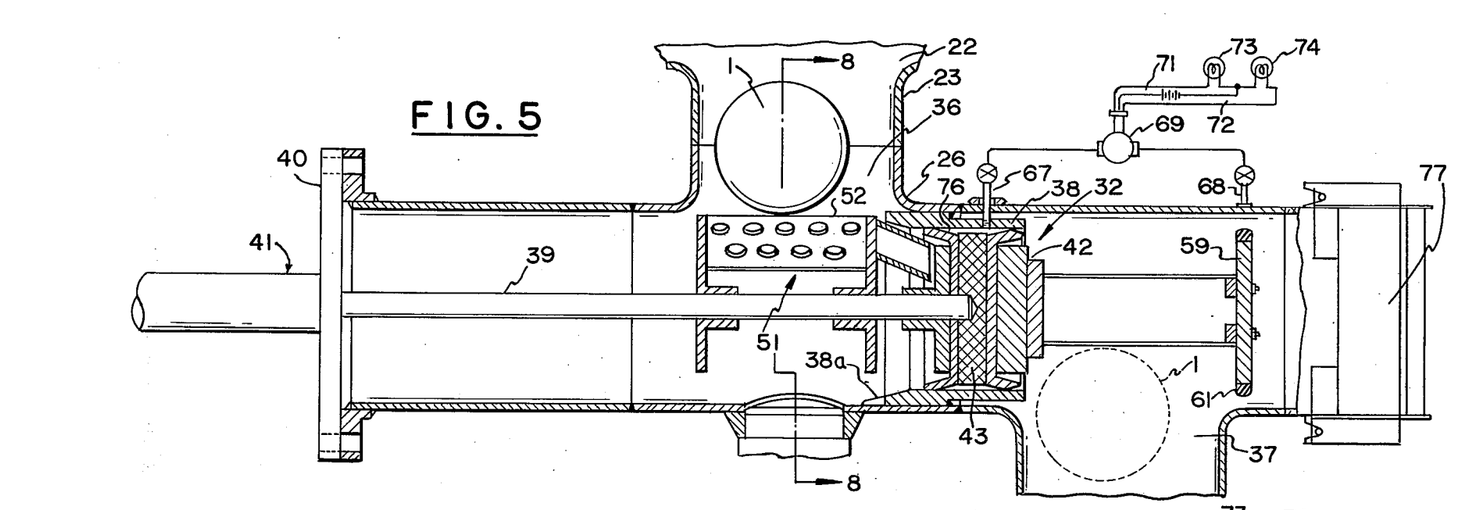
FIG. 5 is a side elevational view on an enlarged scale, showing the working parts of the sphere launching device, with the inner shuttle assembly being in sphere launching position.
Figure 6:
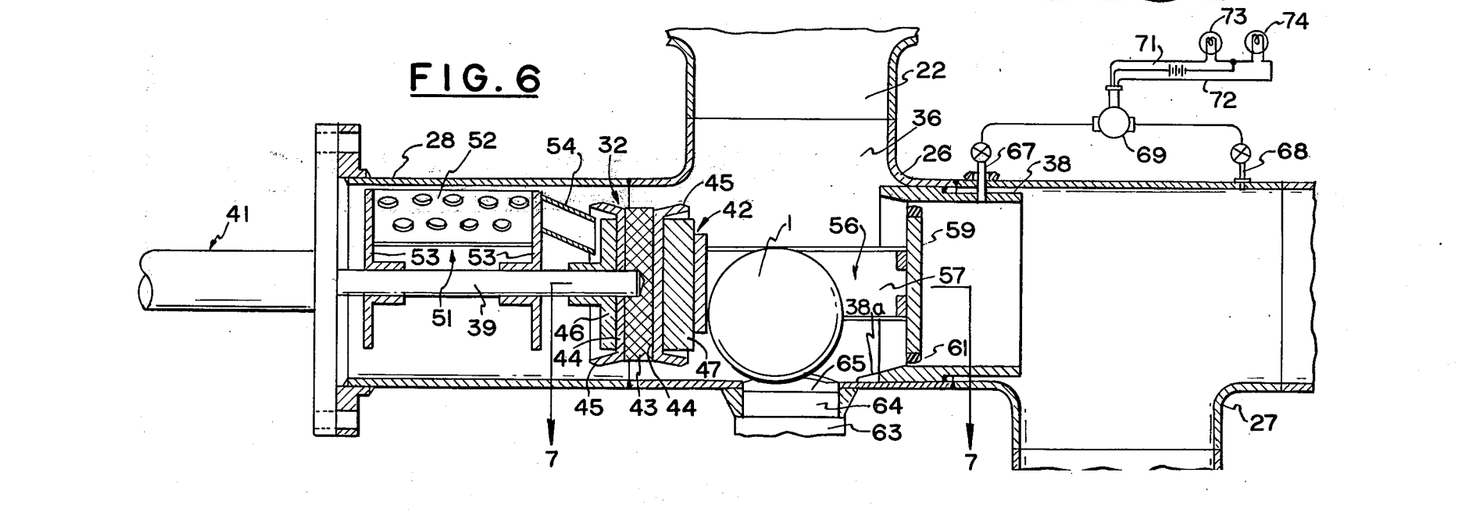
FIG. 6 is a view like FIG. 5 but showing the shuttle assembly in sphere receiving position.

Referring to the details illustrated in FIGS. 5 and 6, it will be evident that the use of Tees 26 and 27 together with the cylindrical extension 28 provides a simple way to fabricate the body of the interchange, and for providing the sphere receiving and sphere launching openings 36 and 37. Opening 36 directly communicates with the downward extending passage of the Tee 22, and the opening 37 directly communicates with the Tee 29. Preferably the interchange extends horizontally, whereby a sphere may move downwardly by gravity through the opening 36, and also downwardly by gravity from the interchange through the launching opening 37. It will be noted that both the openings 36 and 37 are substantially greater in diameter than the diameter of the spheres. Therefore spheres may move freely through the interchange without any squeezing or other distorting forces being applied.

A sleeve 38 is disposed within the interchange body and is secured in place by welding. In general this sleeve is located between the axially spaced openings 36 and 37.

The shuttle assembly 32 is carried by an operating rod 39 which extends through the end closure wall 40 and is aligned with the axis of the interchange body. Suitable operating means 41, such as a double-acting hydraulic cylinder-piston assembly, is shown mounted upon closure plate 40, and has its operating piston connected to the rod 39.

The shuttle assembly includes a plunger together with a sphere guard and a sphere carrier. The plunger 42 is attached to the inner end of the operating rod 39 and includes resilient sealing means whereby a seal is formed with the inner peripheral surface of the sleeve 38 when the shuttle assembly is in the sphere launching position illustrated in FIG. 5. More specifically the plunger as illustrated consists of an annular member 43 secured to the inner end of the rod 39 and serving to mount the sealing members 44. These sealing members are preferably in the form of sealing cups formed of suitable resilient material, such as a synthetic rubber. The cups are positioned whereby their resilient sealing flanges 45 extend in opposite directions. Annular clamping members 46 and 47 serve to clamp the sealing members against the mounting member 43. When the sealing members 44 are relaxed as shown in FIG. 6, the exterior diameter of the flanges 45 is substantially greater than the internal diameter of the sleeve 38. Therefore when the plunger is moved from the position shown in FIG. 6 to that of FIG. 5, the flanges 45 are flexed and radially contracted. When the plunger is within the sleeve 38 the flanges 45 seal on axially spaced annular areas.

Figure 8:
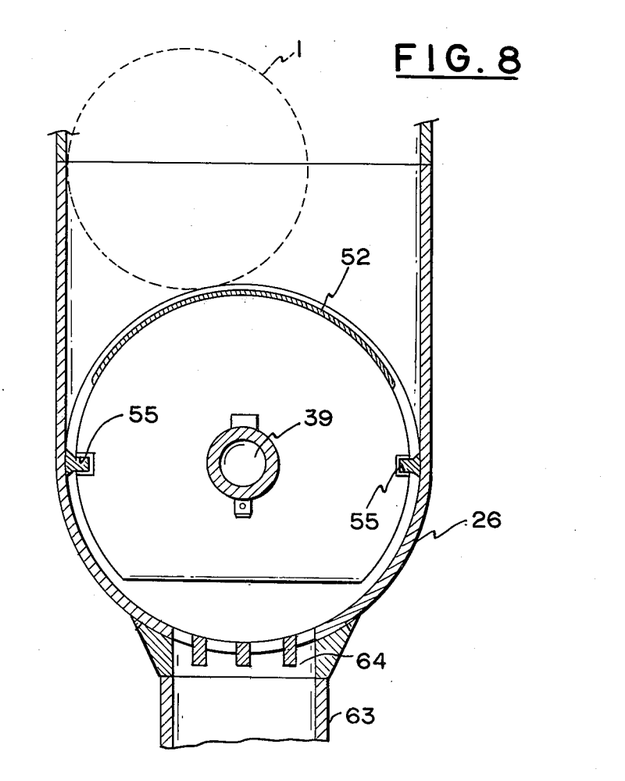
FIG. 8 is a section taken along the line 8—8 of FIG. 5.

The guard means 51 extends from one end of the plunger. It can consist of a perforated metal wall 52 shaped like the segment of a cylinder. It is attached at its ends to the mounting members 53, the latter secured to the operating rod 39. A sloped guard extension 54, which may be a simple piece of sheet metal, is also carried by one of the mounting members 53 and extends between this member and the plunger 42. When the shuttle assembly is in the sphere launching position shown in FIG. 5, it is apparent that the guard means blocks entrance of a sphere into the interchange. However, when the shuttle assembly is moved to the position shown in FIG. 6, the guard means is removed from blocking position and thus permits the sphere to move into the interchange. As shown in FIG. 8, members 53 are notched to engage the side rails or guide bars 55, thereby providing guide means and preventing rotation about the axis of rod 39.

Small guide ramps 38a are fixed within the body adjacent the inlet end of the sleeve 38. They serve to guide spheres into the sleeve.

Figure 7:
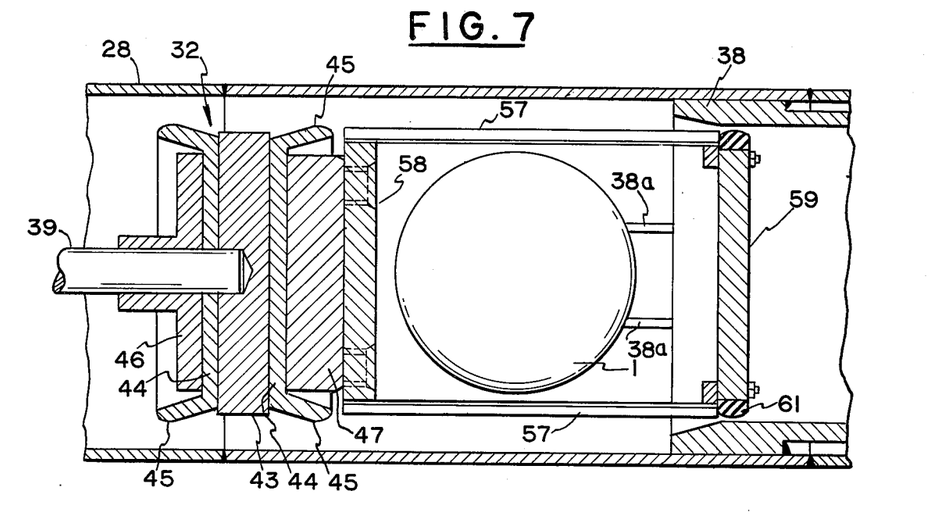
FIG. 7 is a section taken along the line 7—7 of FIG. 6.

The sphere carrier means 56 serves to receive and accommodate a sphere when the shuttle assembly is in the sphere receiving position shown in FIG. 6. It generally guides the sphere during movement of the shuttle assembly to sphere launching position, and in sphere launching position it permits the sphere to fall freely by gravity through the opening 37. The particular type of sphere carrier illustrated consists of spaced plates 57, each of which is secured at one end to a mounting member 58 that is secured to the member 47 of the plunger. As shown in FIG. 7, the spacing between the plates 57 is substantially greater than the diameter of a sphere. The other end of each plate 57 is secured to the member 59, which preferably functions both as a part of the carrier and as a flow restriction device. The spacing between members 58 and 59 is likewise substantially greater than the diameter of the spheres.

To enable it to function as flow restriction means, the member 59 is circular in configuration, with a diameter such that it may pass through the sleeve 38. It is desirable to provide the periphery of member 59 with a rim 61 made of resilient material such as a suitable synthetic rubber, thereby avoiding any possible injury to the inner peripheral surface of sleeve 38.

The rim 61 need not have a sealed fit with the sleeve 38, since it will function without such seal to provide the desired restriction. It will be noted that in the sphere receiving position shown in FIG. 6, the plate 59 is disposed within the sleeve 38. However, when the shuttle assembly is in the sphere launching position of FIG. 5, the member 59 is completely out of the sleeve 38 and is out of the way of the opening 37 through which the sphere is launched.

In practice, the hydraulic operator 41 or some suitable power operating means is relied upon to move the operating rod 39 between limiting positions, namely the sphere launching position shown in FIG. 5, and the sphere receiving position shown in FIG. 6. A complete cycle of operation to carry out a meter proving run involves movement of the shuttle assembly from the position shown in FIG. 5 to that of FIG. 6 whereby a sphere is received within the sphere carrier. The shuttle assembly is then moved back to the position shown in FIG. 5, whereby the sphere is permitted to move from the carrier through the launching opening 37.

FIG. 1 also shows one manner of connecting the line 13 with the interchange 11. Line 13 is directly connected with the Tee 22, with a bypass line being connected to the lower side of the interchange at a point directly below the opening 36. More particularly as shown in FIG. 6 the lower wall of the Tee is shown provided with an opening 64 which communicates with the branch line 63 and is provided with grid bars 65. Line 63 serves as a bypass to ensure some downward flow of liquid through the Tee 26, thus aiding in gravity movement of the sphere into the interchanger and into the sphere carrier 56.

Previous refernce has been made to the desirability of leak detection. It is important in this connection to detect any leakage past the plunger when the plunger is in the sphere launching position shown in FIG. 5. The means illustrated for this purpose consist of connecting pipes 67 and 68, one communicating with the interior of the sleeve 38, and the other with the interior of the Tee 27. These pipes are in connection with the differential pressure operated device 69. The device 69 can consist of two closed fluid chambers in communication with the lines 67 and 68, and separated by movable fluid pressure operated member. The fluid pressure operated member may in turn operate switch contacts, whereby one set of contacts is closed when no differential pressure exists, or when the differential pressure is below a predetermined value, and a second set of contacts operated when a differential pressure exists that is greater than the predetermined value. The two electrical circuits 71 and 72 controlled by the two sets of contacts may serve to energize the signal lamps 73 and 74.

Assuming that the interchange is completely filled with liquid, movement of the shuttle assembly from the position shown in FIG. 6 to that of FIG. 5 causes radial contraction of the sealing members 44, with flexing of the flanges 45, and as a result there is a substantial drop in pressure in the space 76 between the sealing members. This drop in pressure serves to operate the pressure differential device 69, whereby one of the signal lamps is illuminated. While the differential is maintained no leakage is occurring past the plunger. If any leakage should occur past the plunger or past either one of the sealing cups, then the pressure differential is reduced, and when it falls beyond a predetermined value, contacts of the device 69 are operated to cause the other one of the two signal lamps to be illuminated.

At various times it may be desirable to remove a sphere from the interchange, or to introduce a new sphere. For this purpose the Tee 27 is provided with a removable closure 77, thus providing an access opening substantially greater than the diameter of the sphere. When it is desired to remove or introduce a sphere, the restriction member 59 is detached from the members 56, and then the sphere may be readily removed or introduced.

Operation of the apparatus in the form illustrated in the drawings is as follows. It is assumed that the shuttle assembly is in the position shown in FIG. 6, and that a sphere 1 from a previous run has moved downwardly by gravity through the opening 22 into the position as shown in FIG. 6, between the members 57 of the sphere carrier 56. To start a run the operator 41 is energized to move the shuttle assembly from the sphere receiving position of FIG. 6 to the sphere launching position shown in FIG. 5. This serves to move the sphere through the sleeve 38 to a position immediately above the launching opening 37 whereby the sphere may fall freely by gravity through the opening 37 into the Tee 29, to be moved by fluid flow into the inlet portion 10a of the meter prover loop. When the plunger moves well within the sleeve 38, with contraction of the sealing flanges 45, a drop in pressure occurs within space 76, thus applying a differential pressure to the device 69. This serves to illuminate one of the signal lamps 73 or 74, thus appraising the operator of the fact that a sufficient differential pressure has been developed for purposes of leak detection. Assuming that no leakage occurs past either one or both of the ceiling flanges 45 during the course of a meter proving run, then the differential pressure is maintained and the continued illumination of the signal lamp shows that no leakage is occurring. If leakage should occur then the differential pressure is reduced, and when it falls below a predetermined value, the one signal lamp is extinguished and the other lamp illuminated. At the end of the meter proving run the sphere reaches the Tee 22 and then moves downwardly by gravity to the position shown in FIG. 5, in engagement with sphere guard member 52. The sphere remains in this position until commencement of a new run.

It will be evident that energization of the operator 41 can be manually controlled, or it can be automated for remote control. Particularly the hydraulic system connected to the operator 41 can be such that when a cycle of operation is initiated it continues automatically to return the shuttle assembly back to the initial position shown in FIG. 5.

The function of the restriction member 59 is to prevent any substantial backflow of liquid through the sleeve 38, when the shuttle assembly is moved to the position of FIG. 6. Without this restriction member liquid flow would occur from the Tee 29 into the body of the interchange and through the opening 36. Such flow would tend to prevent movement of a sphere into the sphere carrier at the end of the proving cycle. With the restriction member no substantial backflow can occur, and therefore the sphere is enabled to move downwardly by gravity to the sphere carrying position of FIG. 6. In addition to functioning as a restriction member, the member 59 also functions as a guide for the shuttle assembly, particularly when the member 59 is within the sleeve 38. It also functions as one end wall for the space within the carrier which accommodates the sphere.

With respect to the sphere launching operation, the assembly 32 establishes and maintains a seal with respect to the sleeve 38 for a substantial amount of travel of the assembly toward sphere launching position. Thus the leading sealing flange 45 first engages and forms a seal with one end of sleeve 38, and this seal is maintained during further travel to the launching position shown in FIG. 5. At or near the limiting position of the assembly 32 shown in FIG. 5, the carrier brings the sphere into registry with opening 37, whereby the sphere is free to move downwardly as shown in dotted lines in FIG. 5.

Figure 9:
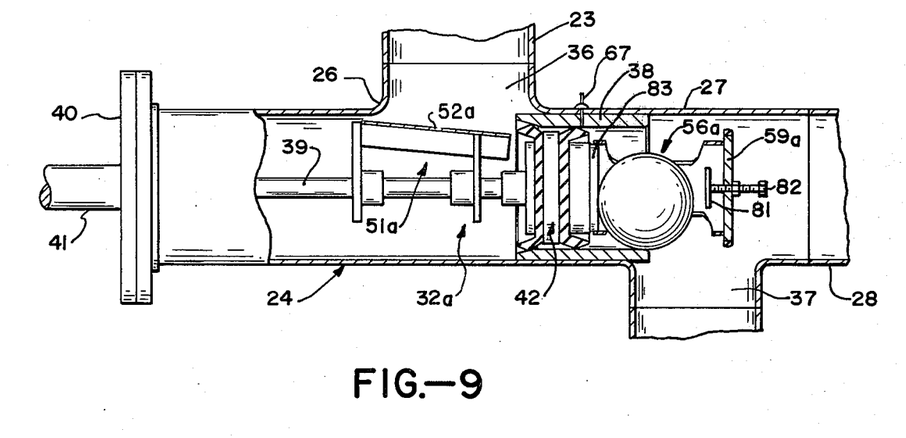
FIG. 9 is a side elevational view partly in section illustrating another embodiment of the invention.
Figure 10:
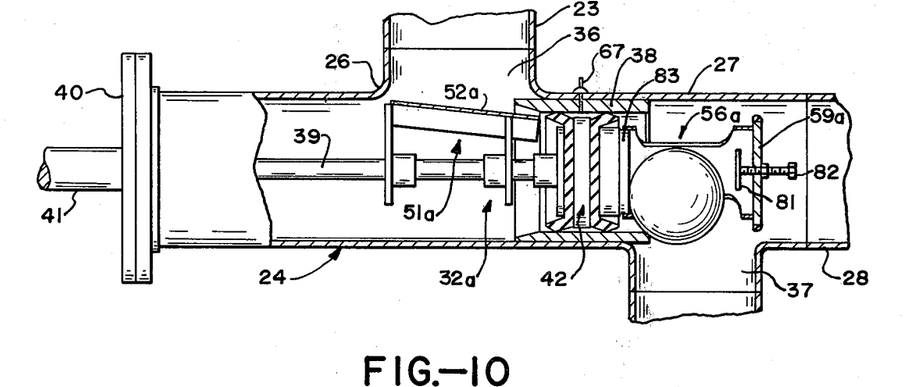
FIG. 10 is a view like FIG. 9 but showing the shuttle assembly in a different operating position.
Figure 11:
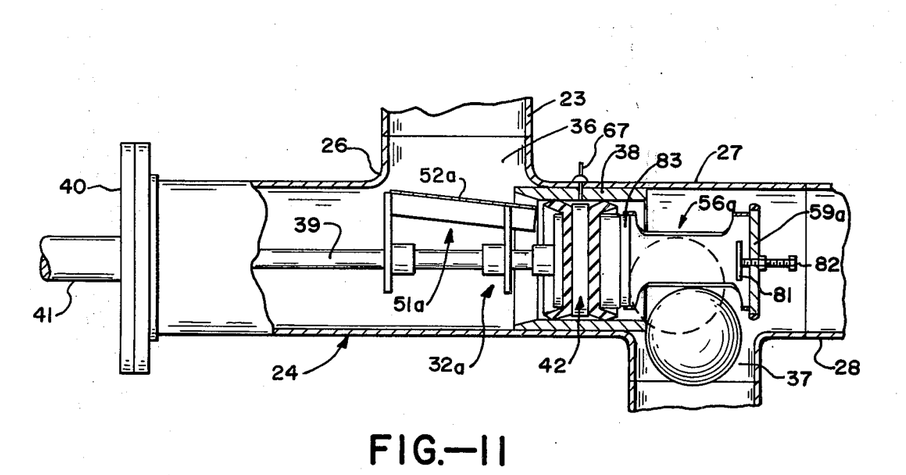
FIG. 11 is a view like FIG. 9 but showing the shuttle assembly in another operating position in which the sphere is being launched.

In the embodiment of FIGS. 9, 10 and 11, the sphere accommodating cavity of the carrier is adjustable in length, thus making it possible to more accurately control the time the sphere is launched with relation to the positioning of the assembly 32a. As shown in FIGS. 9–11, the guard means 51a makes use of a metal wall 52a generally shaped like wall 52 but inclined toward the rod 31 to aid relative movement of a sphere over the sealing assembly 42. The sphere carrier means 56a in this instance forms a sphere receiving cavity which is open at its upper and lower sides, the same as in the embodiment of FIGS. 1–8. The carrier also includes the flow restricting member 59a. An abutment member 81 is disposed within the carrier near the member 59a and is adjustably mounted as by means of a threaded screw 82. The end of the sphere cavity nearest the sealing assembly is formed by the wall 83.

The embodiment of FIGS. 9–11 permits the effective length of the carrier cavity to be adjusted to control the release of a sphere relative to the positioning of the assembly 32. FIG. 9 shows assembly 32a approaching launching position with the plunger within the sleeve 38. The sphere is being restrained against launching. FIG. 10 shows the assembly 32a after some further movement toward launching position. Here the sphere is still retained but is about to be released. FIG. 11 shows the assembly at the end of its stroke with the sphere being released and free to move through opening 37. Thus by adjusting the setting of member 81, one may control the time of launching relative to the stroke of the assembly 32a, and also the accuracy of launching. Also such adjustment can be used to accommodate the apparatus to spheres of a certain diameter, within a limited range of diameters.

It will be evident from the foregoing that the invention provides a relatively simple sphere launcher and meter prover which overcomes many of the disadvantages of prior devices of this kind. The construction is simple and compact, and relatively economical to manufacture. The spheres are handled and launched in such a manner that no distorting forces are applied, and therefore there is no tendency for the spheres to become injured in such a manner as might cause leakage past the spheres as they are being flow propelled through the metering loop. The main flow of the line is not directed through the interchange, and thus the shuttle assembly can be moved rapidly between its two operating positions without causing hydraulic shock. The leak detection means is relatively simple and effective, particularly because it makes use of differential fluid pressure.

We claim:

1. In a sphere launching device, a hollow body, one side wall of the body having a first opening adapted to be connected with a source of fluid and through which a sphere may pass into a first space within the body, a shuttle assembly disposed within the body, said shuttle assembly including a plunger, sphere guard means secured to and extending from one end of the plunger and a sphere carrier secured to and extending from the other opposite end of the plunger, the carrier having a sphere accommodating cavity dimensioned to permit a sphere to move into the same from the first opening, said assembly being movable in opposite directions between a first sphere launching position and a second sphere receiving position, a second opening in one side wall of the body through which a sphere may pass out from a second space within the body, the spacing between the centers of said openings as measured along the axis of the body corresponding generally to the distance of movement of the shuttle assembly between its first launching and second sphere receiving positions, whereby in said first operating position the guard means is positioned to obstruct entrance of a sphere into the body from the first opening and the sphere carrier is positioned to permit a sphere to move from the sphere accommodating cavity of the same through the second opening, a cylindrical sleeve forming a part of the body and located between said openings in alignment with the shuttle assembly, the sleeve having an internal diameter greater than the diameter of the sphere, said plunger being disposed within said sleeve when the shuttle assembly is in said first sphere launching position, resilient sealing means carried by the plunger and forming a seal between the plunger and the sleeve when the assembly is in said sphere launching position, and a flow restricting member at that portion of the sphere carrier which is remote from the plunger to prevent backflow through the sleeve, said member being disposed within said sleeve when said assembly is in its second sphere receiving position, the sleeve being dimensioned whereby for a substantial distance of movement of the shuttle assembly before reaching sphere launching position said sealing means maintains sealing contact with the sleeve, thereby providing a fluid seal between the first and second body spaces.

2. A sphere launcher as in claim 1 in which the sealing means for the plunger consists of two sealing members formed of resilient material adapted to form sealing contact with the inner periphery of the sleeve on two axially spaced annular areas, said sealing members being radially compressed when the plunger is introduced into the sleeve, and differential pressure operated means having fluid connections with the space between said sealing members and the line fluid pressure.

3. A sphere launcher as in claim 1 in which said sphere carrier includes means for adjusting the effective length of the cavity in the direction of movement of the shuttle assembly.

4. A sphere launcher as in claim 1 in which the sphere carrier consists of members spaced apart a distance greater than the diameter of the spheres to form said cavity, said members being disposed on opposite sides of a sphere entering the body from the sphere receiving opening when the shuttle assembly is in said sphere receiving position, and disposed to permit free movement of the sphere from the cavity through the second opening, when the shuttle assembly is in said sphere launching position.

5. A sphere launcher as in claim 4 in which said members are secured to the adjacent end of the plunger and to said flow restricting member.

6. In a meter prover apparatus, a metering pipe having inlet and outlet ends adapted to be connected to upstream and downstream portions of a main liquid flow line, and interchange means for transferring a flow propelled sphere from the outlet end to the inlet end of the metering pipe, the interchange means comprising a hollow elongated body forming first and second sphere accommodating spaces in longitudinally spaced regions of the body, a first opening in one side wall of the body in communication with the first sphere accommodating space, means including piping forming a connection between the outlet end of the metering pipe and said first opening for receiving a sphere from the metering pipe and for delivering the same to the first opening, a second opening in another side wall of the body communicating with the second space, means including piping connecting the second opening with the inlet end of the metering pipe whereby a sphere moving through the second opening is delivered to the inlet end of the metering pipe, and means within the hollow body for transferring a sphere received through the first opening to the second space whereby the sphere is caused to move from the second space through the second opening, said last named means comprising a plunger, means serving to carry the plunger for movements in opposite directions between said spaces and between first and second limiting positions, a cylindrical sleeve forming a part of the body and located between said spaces, the sleeve having its axis aligned with the axis of the plunger, the sleeve having an internal diameter greater than the diameter of the sphere and forming a passage connecting the first and second spaces, the plunger in its first limiting position being retracted from the sleeve in the direction of the first space and in its second limiting position being within the sleeve, sealing means carried by the plunger for establishing a fluid tight seal between the plunger and the sleeve when the plunger is within the sleeve, whereby a fluid seal is formed between said first and second body spaces, the sleeve being so dimensioned that said seal is maintained for a substantial travel of the plunger immediately before the plunger reaches its second limiting position, means for preventing movement of a sphere through the first opening and into the first space when the plunger is in its second limiting position and also serving to permit such sphere to move through the first opening into the first space when the plunger is in its first limiting position, means forming a sphere carrier secured to the plunger and extending toward said second body opening, said carrier being formed to provide a sphere accommodating recess located between the plunger and that end of the carrier which is remote from the plunger, said recess being positioned to receive a sphere moving through the first opening when the plunger is in its first limiting position and being positioned to enable a sphere in the recess to move out of the same into the second opening when the plunger is in its second limiting position, and a flow restricting member mounted upon said remote end of the sphere carrier to prevent backflow through the sleeve, said member being moved to a position within the sleeve to thereby restrict flow therethrough when the plunger is in its first limiting position.

7. Apparatus as in claim 6 together with means for adjusting the length of the recess of the sphere carrier in the direction of movement of the plunger.

8. Apparatus as in claim 6 in which said guard means is secured to the plunger and extends across the first opening to obstruct the same when the plunger is in its second limiting position.

9. Apparatus as in claim 6 in which the sphere carrier is formed by spaced members extending between the plunger and the flow restricting member.

10. Sphere handling apparatus comprising a hollow elongated body forming first and second sphere accommodating spaces in longitudinal spaced regions of the body, a first opening in one side wall of the body in communication with the first sphere accommodating space, and means within the hollow body for transferring a sphere received through the first opening to the second space whereby the sphere is permitted to move from the second space through the second opening, said last means comprising a plunger, means serving to carry the plunger for movement in opposite directions between said spaces and between first and second limiting positions, a cylindrical sleeve forming a part of the body and located between said spaces, the sleeve having its axis aligned with the axis of the plunger, the sleeve having an internal diameter greater than the diameter of a sphere and forming a passage connecting the first and second spaces, the plunger in its first limiting position being retracted from the sleeve in the direction of the first space and in its second limiting position being within the sleeve, sealing means carried by the plunger for establishing a fluid-tight seal between the plunger and the sleeve when the plunger is within the sleeve whereby a fluid seal is formed between said first and second body spaces, the sleeve being so dimensioned that said seal is maintained for a substantial travel of the plunger immediately before the plunger reaches its second limiting position, means for preventing movement of a sphere through the first opening and into the first space when the plunger is in its second limiting position and also serving to permit such sphere to move through the first opening into the first space when the plunger is in its first limiting position, means forming a sphere carrier secured to the plunger and extending toward said second body opening, said carrier being formed to provide a sphere accommodating recess located between the plunger and that end of the carrier which is remote from the plunger, said recess being positioned to receive a sphere moving through the first opening when the plunger is in its first limiting position and being positioned to enable a sphere in the recess to move out of the same through the second opening when the plunger is in its second limiting position, and a flow restricting member having a diameter less than the internal diameter of the sleeve mounted upon said remote end of the sphere carrier, to prevent backflow through the sleeve said member being moved to a position within the sleeve to thereby restrict flow therethrough when the plunger is in its first limiting position.

11. Apparatus as in claim 10 together with means for adjusting the length of the recess of the sphere carrier in the direction of movement of the plunger.

12. Apparatus as in claim 10 in which said guard means is secured to the plunger and extends across the first opening to obstruct the same when the plunger is in its second limiting position.

13. Apparatus as in claim 10 in which the sphere carrier is formed by spaced members extending between the plunger and the flow restricting member.

14. In a meter proving method making use of a metering pipe having inlet and outlet ends adapted to be connected to upstream and downstream portions of a main liquid flow line together with interchange means for transferring a flow propelled sphere from the outlet end to the inlet end of the metering pipe, the interchange means comprising a hollow elongated body forming first and second sphere accommodating spaces in longitudinally spaced regions of the body and having a first opening in one side wall of the body in communication with the first sphere accommodating space and connected with the outlet end of the metering pipe to receive a sphere therefrom, the body having a second opening in another side wall of the same communicating with the second space and connected with the inlet end of the metering pipe to deliver a sphere thereto, shuttle means within the body for transferring a sphere received through the first opening to the second space whereby the sphere is caused to move from the second space through the second opening, said shuttle means comprising a plunger, means serving to carry the plunger for movements in opposite directions between the spaces and between first and second limiting positions, a cylindrical sleeve forming a part of the body and located between the spaces, the sleeve having an internal diameter greater than the diameter of the sphere and forming a passage connecting the first and second spaces, the plunger in its first limiting position being retracted from the sleeve in the direction of the first space and in its second limiting position being within the sleeve, a sphere carrier secured to the plunger and extending toward the second body opening, the carrier forming a sphere accommodating recess between the plunger and that end of the carrier remote from the plunger, the plunger having sealing means carried by the same for establishing a fluid tight seal between the plunger and the sleeve when the plunger is within the sleeve whereby a fluid seal is formed between the first and second body spaces, the sleeve being so dimensioned that said seal is maintained for a substanital travel of the plunger therin, the method comprising starting a cycle of operation with the sphere carrier of the shuttle means in its sphere receiving position and with a sphere in the cavity of the carrier, moving the shuttle means toward sphere launching position whereby a seal is established between the plunger and the sleeve, and thereafter continuing such movement of the plunger for a substantial travel of the same until the plunger reaches its second limiting position, whereby a sphere is caused to be launched from the sphere carrier into the inlet end of the metering pipe, the seal between the plunger and the sleeve being maintained during said continued movement, returning the plunger and sphere carrier to sphere receiving position to receive a sphere delivered from the outlet end of the metering pipe, and restricting backflow of liquid through the sleeve while the sphere carrier is in sphere receiving position.

15. A method as in claim 14 in which a sphere moves into the interchange body by gravity and moves out of the body by gravity.

* * * * *